(12) United States Patent
Emori et al.

(10) Patent No.: US 6,430,066 B2
(45) Date of Patent: Aug. 6, 2002

(54) ELECTRIC POWER SYSTEM HAVING SERIES CONNECTED CAPACITOR

(75) Inventors: Akihiko Emori, Hitachi; Hisao Sonobe, Hitachinaka; Masato Isogai, Mito; Takuya Kinoshita, Hitachi, all of (JP)

(73) Assignees: Hitachi, Ltd., Tokyo; Hitachi Maxell, Ltd., Osaka, both of (JP)

( * ) Notice: Subject to any disclaimer, the term of this patent is extended or adjusted under 35 U.S.C. 154(b) by 0 days.

(21) Appl. No.: 09/803,938

(22) Filed: Mar. 13, 2001

(30) Foreign Application Priority Data

Mar. 14, 2000 (JP) .................................. 2000-076335

(51) Int. Cl.⁷ ............................................. H02M 7/539
(52) U.S. Cl. ............................. 363/43; 363/71; 363/97
(58) Field of Search ............................. 363/43, 71, 95, 363/97, 131

(56) References Cited

U.S. PATENT DOCUMENTS

| | | | | |
|---|---|---|---|---|
| 4,203,151 A | * | 5/1980 | Baker | 363/43 |
| 4,628,438 A | * | 12/1986 | Montague | 363/43 |
| 4,685,043 A | * | 8/1987 | Mehnert | 363/43 |
| 5,841,645 A | * | 11/1998 | Sato | 363/43 |
| 6,031,738 A | * | 2/2000 | Lipo et al. | 363/43 |
| 6,151,227 A | * | 11/2000 | Mizutani et al. | 363/71 |

* cited by examiner

Primary Examiner—Jeffrey Sterrett
(74) Attorney, Agent, or Firm—Antonelli, Terry, Stout & Kraus, LLP (57) ABSTRACT

An electric power system comprises a plurality of capacitors connected in series, a plurality of DC-AC conversion circuits converting each DC voltage of the plurality of capacitor to an AC signal that an AC component equivalent to the inter-terminal DC voltage of each of the capacitors is superimposed on the respective DC voltages and a plurality of condenser couplers break the respective DC voltages and output the AC components respectively, and a processing circuit detecting the inter-terminal DC voltage of the corresponding capacitor from the AC component.

15 Claims, 11 Drawing Sheets

CONTROL SIGNAL

FIG. 3b

OUTPUT VOLTAGE OF
DC-AC CONVERSION

FIG. 3c

OUTPUT WAVEFORM OF
CONDENSER COUPLER

FIG. 3d

OUTPUT WAVEFORM
BY INVERSION CIRCUIT
(DOTTED LINE) (FIG. 3)

FIG. 11
MODIFIED CONVENTIONAL CIRCUIT

ELECTRIC POWER SYSTEM HAVING SERIES CONNECTED CAPACITOR

BACKGROUND OF THE INVENTION

The present invention relates to an electric power system.

A conventional battery protective circuit for secondary batteries connected in series is disclosed in Japanese laid-open Patent Publication Hei 8-78060.

Figure 11:
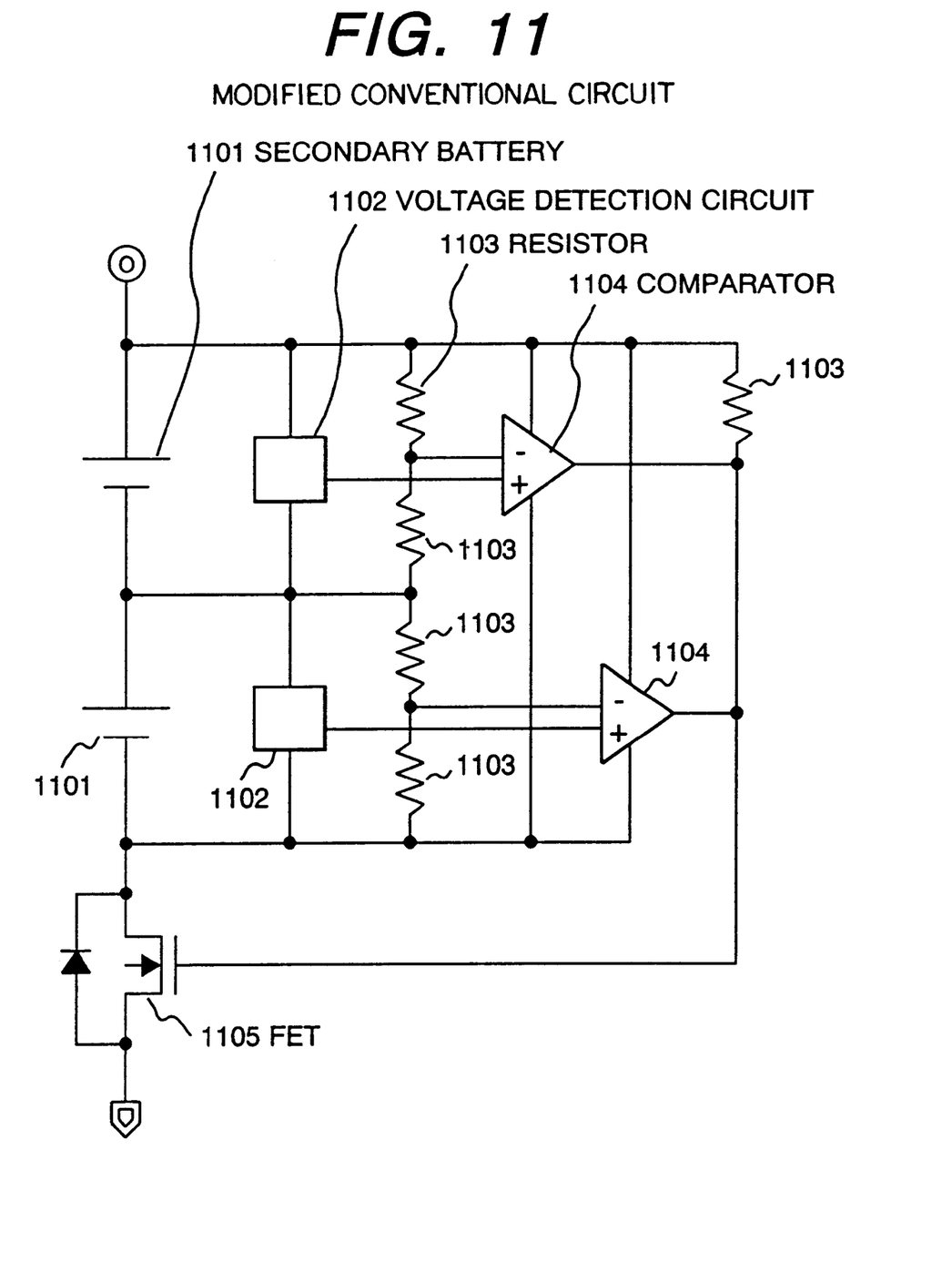
FIG. 11 is a circuit diagram showing a modification of a conventional battery protective circuit.

FIG. 11 is a view showing a modification of the conventional battery protective circuit of Japanese laid-open Patent Publication Hei 8-78060. In FIG. 11, reference numerals 1101 indicate secondary batteries, 1102 voltage detection circuits, 1103 resistors, 1104 comparators, and 1105 an FET.

The two secondary batteries 1101 are connected in series and the voltage detection circuits 1102 are connected across the respective secondary batteries 1101. To each input of the comparators 1104, a reference voltage by the divided voltage of the resistors 1103 connected in series and the output of the voltage detection circuits 1102 are connected respectively.

Both output of the comparators 1104 are connected to the gate of the FET 1105 inserted in series with the secondary batteries 1101.

The voltage detection circuits 1102 detect the voltages of the secondary batteries 1101 respectively and the comparators 1104 compare the detected value with the reference voltage by the divided voltage of resistor. When any of the secondary batteries 1101 is fully charged and the detected value of any of the voltage detection circuits 1102 is more than the reference voltage, the output of any of the comparators 1104 becomes low revel, and the FET 1105 is turned off, and the charging is stopped.

The conventional battery protective circuit requires the exclusive voltage detection circuits 1102 respectively for the two secondary batteries 1101 connected in series. The reason is that the potential levels of the detected values of the voltage detection circuits 1102 are different from each other on the basis of the lowest negative terminal of the secondary batteries 1101 connected in series.

The voltage division resistors 1103 must be also installed exclusively for the secondary batteries 1101 respectively.

The values of the resistors 1103 are always varied from the nominal value within a certain range in the production process, so that the reference value for specifying full charging is also varied and the precision of the reference voltage is lowered.

Further, to make the different potential levels of detected values of the voltage detection circuits 1102 equal by level-shifting, the comparators 1104 must be installed exclusively for the secondary batteries 1101 respectively. Moreover, the withstand voltages of the comparators 1104 must be equal to the total voltage of the batteries connected in series.

Even if a circuit fulfills the same function for each of the secondary batteries like this, a circuit fit to each potential level is required for each of the secondary batteries. Accordingly, assuming that a plurality of batteries 1101 are additionally connected in series, the number of circuits increases and the cost, size, and power consumption also increase. Parts of the comparators 1104 having a withstand voltage meeting the total voltage of the batteries connected in series do not exist actually and it is difficult to realize this circuit.

SUMMARY OF THE INVENTION

The electric power system of the present invention has a plurality of capacitors connected in series, a plurality of DC-AC conversion circuits for converting and outputting each DC voltage of the plurality of capacitors to an AC signal that an AC component equivalent to the inter-terminal DC voltage of each of the capacitors is superimposed on the each DC voltage, a plurality of condenser couplers for breaking the each DC voltage from each output of the plurality of DC-AC conversion circuits and outputting the AC components respectively, and a processing circuit for selecting each output of the plurality of condenser couplers and detecting the inter-terminal DC voltage of the corresponding capacitor from the selected AC component.

The electric power system of the present invention has a plurality of capacitors connected in series, a plurality of DC-AC conversion circuits for converting and outputting each DC voltage of the plurality of capacitors to an AC signal that an AC component equivalent to the inter-terminal DC voltage of each of the capacitors is superimposed on the each DC voltage, a plurality of condenser couplers for breaking the each DC voltage from each output of the plurality of DC-AC conversion circuits and outputting the AC components respectively, a processing circuit for selecting each output of the plurality of condenser couplers, converting the selected AC component to a digital signal, and detecting the inter-terminal DC voltage of the corresponding capacitor from the digital signal, wherein the processing circuit has a selection circuit for selecting output from the plurality of condenser couplers, an A-D conversion circuit for converting the selected AC component to a digital signal, and a microcomputer for detecting the inter-terminal DC voltage of the corresponding capacitor from the digital signal.

The present invention is an electric power system, wherein the processing circuit has an AC-DC conversion circuit for converting the AC component selected by the selection circuit to a DC voltage which is full-wave rectified and supplies the converted DC voltage to the A-D conversion circuit.

The present invention is an electric power system wherein the plurality of DC-AC conversion circuits have a plurality of control power sources for outputting a voltage higher than the inter-terminal voltage of the plurality of capacitors and perform the conversion operation of the plurality of DC-AC conversion circuits by the output of the plurality of control power sources.

The present invention is an electric power system, wherein the control circuit has a plurality of voltage control voltage sources for outputting a voltage proportional to the inter-terminal voltage of each capacitor of the plurality of capacitors and the output of the plurality of voltage control voltage sources is used as a power source of the AC-DC conversion circuit, and wherein the control circuit has a storage circuit for storing a correction formula and the output of the A-D conversion circuit is correction-operated by the microcomputer on the basis of the storage contents of the storage circuit.

The present invention is an electric power system, wherein each circuit of at least a part of the DC-AC conversion circuit, condenser coupler, and control circuit is each enclosed by an insulating trench formed on the substrate.

DESCRIPTION OF THE PREFERRED EMBODIMENTS

Embodiments of the invention are explained using drawings in detail. Like reference numerals designate like parts throughout the drawings.

(Embodiment 1)

Figure 1:
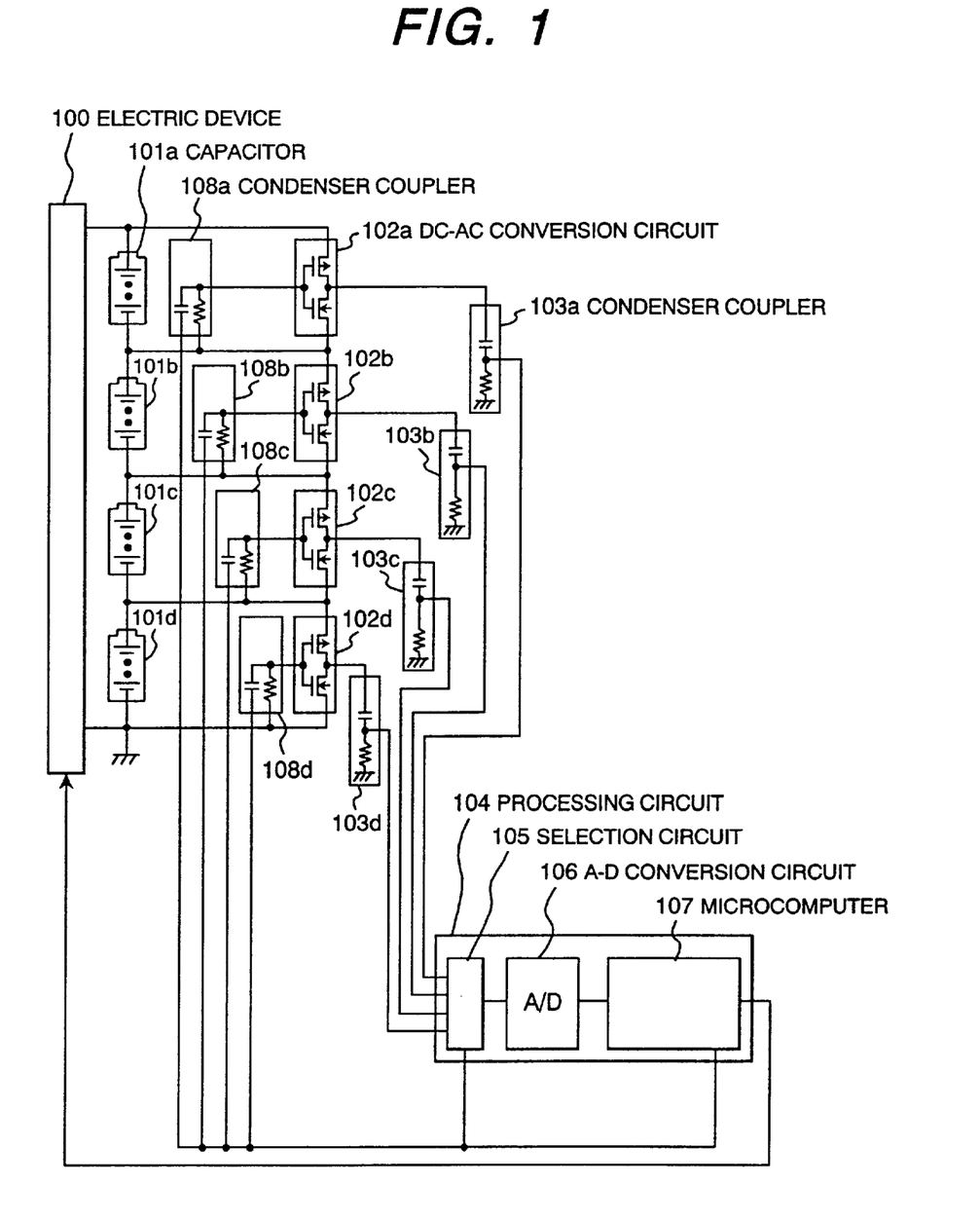
FIG. 1 is a circuit diagram showing the first embodiment of the electric power system of the present invention.

FIG. 1 is a circuit diagram showing the first embodiment of the electric power system of the present invention. In FIG. 1, reference numeral 100 indicates an electric device, 101a, 101b, 101c, and 101d capacitors, 102a, 102b, 102c, and 102d DC-AC conversion circuits, 103a, 103b, 103c, and 103d condenser couplers, and 104 a processing circuit. Reference numeral 105 indicates a selection circuit, 106 an A-D conversion circuit, 107 a microcomputer, and 108a, 108b, 108c, and 108d condenser couplers.

In the present embodiment, the plurality of capacitors 101a, 101b, 101c, and 101d are connected in series and the DC-AC conversion circuits 102a, 102b, 102c, and 102d are respectively connected to the capacitors 101a, 101b, 101c, and 101d in parallel. The DC-AC conversion circuits 102a, 102b, 102c, and 102d are respectively connected to the selection circuit 105 of the processing circuit 104 via the condenser couplers 103a, 103b, 103c, and 103d. The selection circuit 105 is connected to the A-D conversion circuit 106 and the A-D conversion circuit 106 is connected to the microcomputer 107. A control signal is output from the microcomputer 107 controls the conversion operation of the DC-AC conversion circuits 102a, 102b, 102c, and 102d through the condenser couplers 108a, 108b, 108c, and 108d. Also, it is capable of arranging a selection circuit to reduce the power consumption at the output side of the microcomputer 107.

Both ends of the capacitors 101a, 101b, 101c, and 101d connected in series are connected to the electric device 100 and transmit and receive power. The output of the microcomputer 107 of the processing circuit 104 is connected to the electric device 100 and transmits the DC voltage condition of the capacitors 101a, 101b, 101c, and 101d to the electric device 100. Upon receipt of it, the electric device 100 controls transmission and reception of the power.

In this case, the electric device 100 is a second power system (different power system), a motor system for an elevator or an automobile, and a general electrical apparatus.

The capacitors 101a, 101b, 101c, and 101d are an electric energy storage device such as a nickel hydrogen battery, a lead storage battery, a lithium secondary battery, or an electric double layer capacitor or a generating device such as a fuel battery.

The DC-AC conversion circuits 102a, 102b, 102c, and 102d are switches for alternately changing and connecting both ends of each of the capacitors 101a, 101b, 101c, and 101d to its output, and convert and output DC voltage of the capacitors 101a, 101b, 101c, and 101d to an AC voltage.

The DC-AC conversion circuits 102a, 102b, 102c, and 102d are respectively composed of, for example, the inverter circuit of P-MOS and N-MOS connected in series shown in FIG. 1 and a control signal is supplied to both gates of P-MOS and N-MOS which are input terminals from the microcomputer 107 via the condenser couplers 108a, 108b, 108c, and 108d.

Figure 3A:
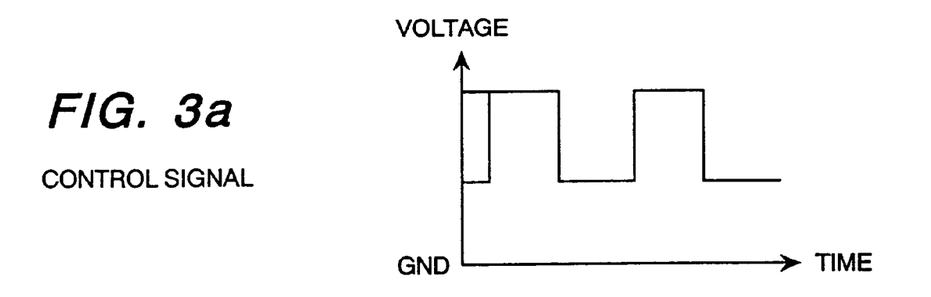
FIGS. 3a to 3d are waveforms showing the operations of FIGS. 1 and 2.
Figure 3B:
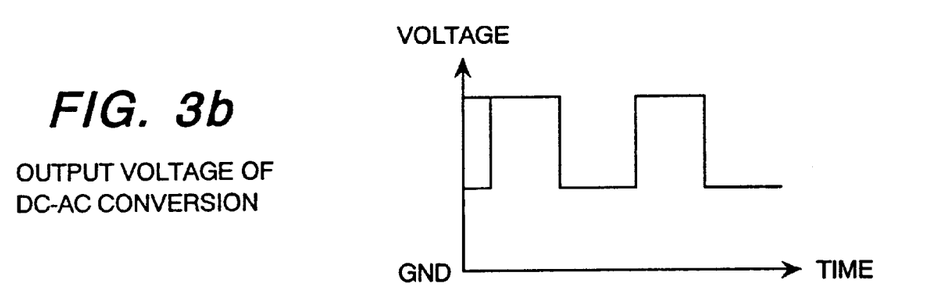

A control signal, for example, as shown in FIG. 3a, is changed to an AC voltage that an AC component is superimposed on a DC voltage through the condenser couplers 108a, 108b, 108c, and 108d. The control signal is supplied to both gates of P-MOS and N-MOS, and P-MOS and N-MOS are alternately turned on and off, and for example, as shown in FIG. 3b, the AC component is superimposed on the inter-terminal DC voltage of each of the capacitors 101a, 101b, 101c, and 101d as output of the DC-AC conversion circuits 102a, 102b, 102c, and 102d.

Figure 3C:
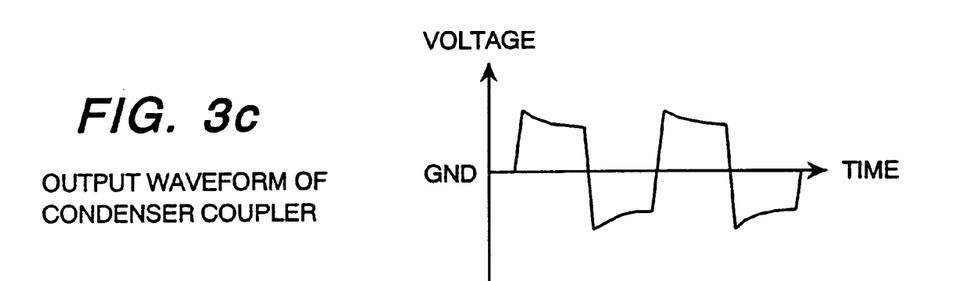

The condenser couplers 103a, 103b, 103c, and 103d are respectively composed of a condenser and a resistance connected in series and the common contact thereof is an output terminal. In this case, each condenser breaks a DC voltage and transmit the AC component and for example, transmits the output waveform to the inverter circuit as shown in FIG. 3c.

The processing circuit 104 receives the output of the DC-AC conversion circuits 102a, 102b, 102c, and 102d by the selection circuit 105 and selects one output AC component among them by a control signal from the microcomputer 107. It may manually switch select the output of the DC-AC conversion circuits.

One output AC component of the selection circuit 105 is converted to a digital signal by the A-D conversion circuit 106, input to the microcomputer 107. The microcomputer 107 detects the inter-terminal voltage of the capacitors 101a, 101b, 101c, and 101d, infers the charging condition, decides an error, decides voltage unbalance between the capacitors, and monitor and manage the capacitors.

Therefore, according to this embodiment, the DC-AC conversion circuits 102a, 102b, 102c, and 102d that the potential level of each of the capacitors 101a, 101b, 101c, and 101d on basis of the lowest negative terminal of the plurality of capacitors 101a, 101b, 101c, and 101d connected in series is different are functionally connected to the processing circuit 104 via the condenser couplers 103a, 103b, 103c, and 103d and a power unit for detecting the inter-terminal voltage of each of the capacitors 101a, 101b, 101c, and 101d and monitoring and managing the condition of the whole capacitors can be realized.

Further, the DC-AC conversion circuits 102a, 102b, 102c, and 102d are electrically insulated by the condenser couplers 103a, 103b, 103c, and 103d and operate at the voltage between the terminals of each capacitors 101a, 101b, 101c, and 101d. Therefore, the DC-AC conversion circuits can be realized at a minimum withstand voltage to the inter-terminal DC voltage of each of the capacitors.

Accordingly, it is possible to realize common use of the processing circuit 104 including voltage detection for the capacitors 101a, 101b, 101c, and 101d and reduce the number of circuits, the number of parts, and power consumption, miniaturization, and cut-down of cost.

(Embodiment 2)

Figure 2:
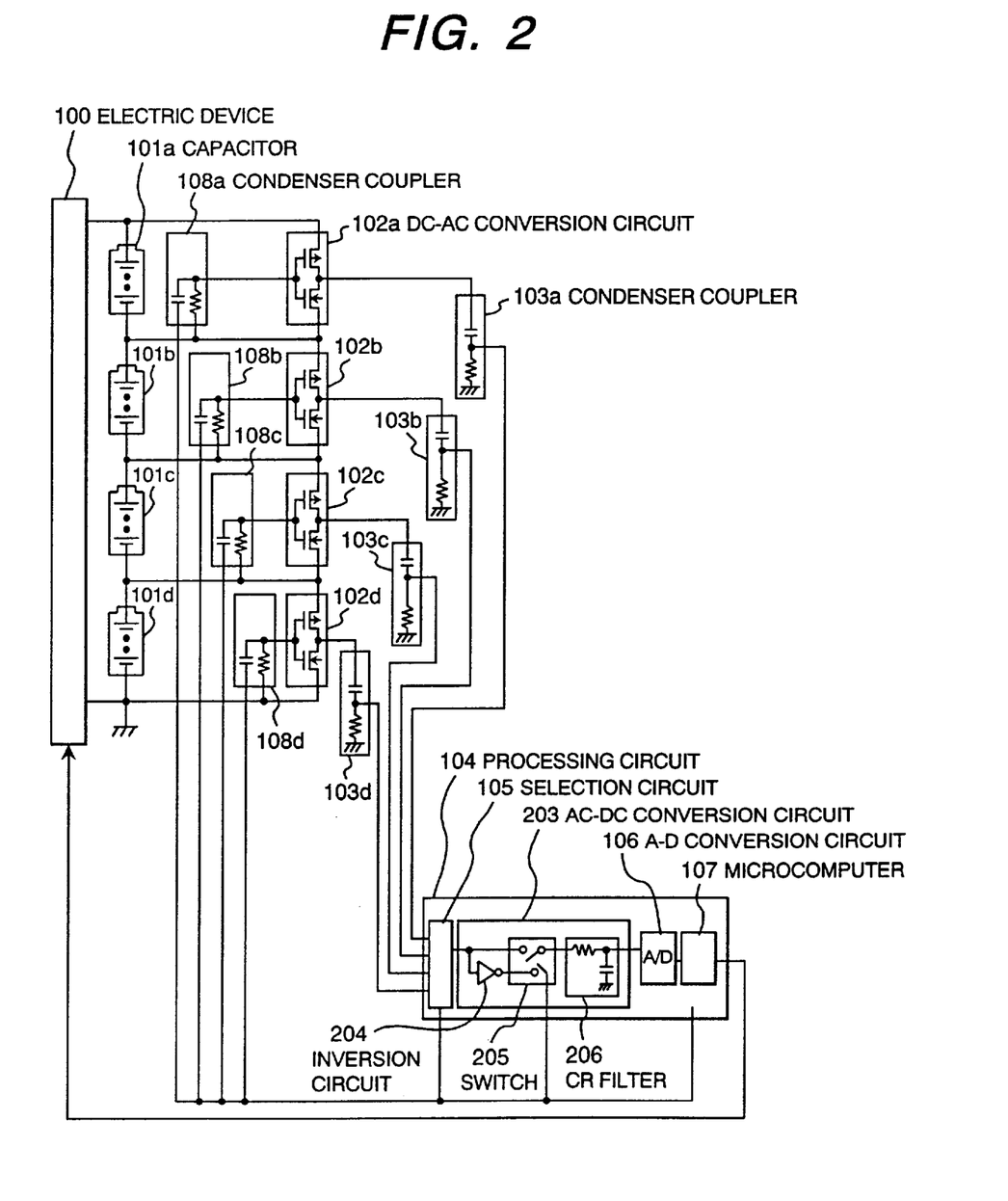
FIG. 2 is a circuit diagram showing the second embodiment of the present invention.

FIG. 2 is a circuit diagram showing the second embodiment of the power system of the present invention. In FIG. 2, the difference from the first embodiment shown in FIG. 1 is that an AC-DC conversion circuit 203 is newly installed between the selection circuit 105 and the A-D conversion circuit 106. The AC-DC conversion circuit 203 is composed of an inversion circuit 204, a switch 205, and a CR filter 206.

Figure 3D:
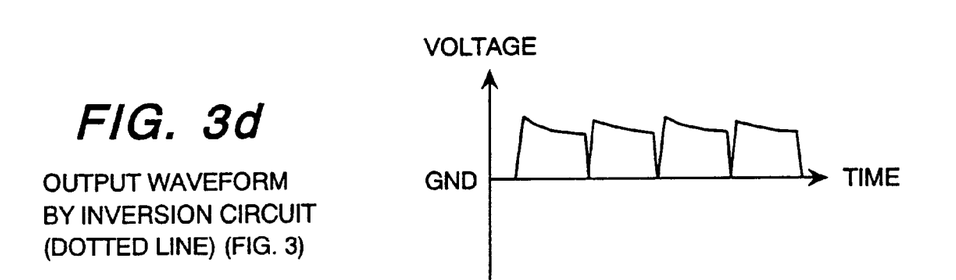

The inversion circuit 204 inverts one output AC component of the selection circuit 105 positive and negative. The switch 205 selects the inverted value and non-inverted value alternately and for example, as shown in FIG. 3d, rectifies the full-wave. The CR filter 206 smoothes the oscillating component of the full-wave. In this way, the AC-DC conversion circuit 203 restores one output AC component of the condenser coupler 103 to a direct current.

Therefore, according to this embodiment of the present invention, a more precise inter-terminal voltage of the capacitors 101a, 101b, 101c, and 101d can be detected.

(Embodiment 3)

Figure 4:
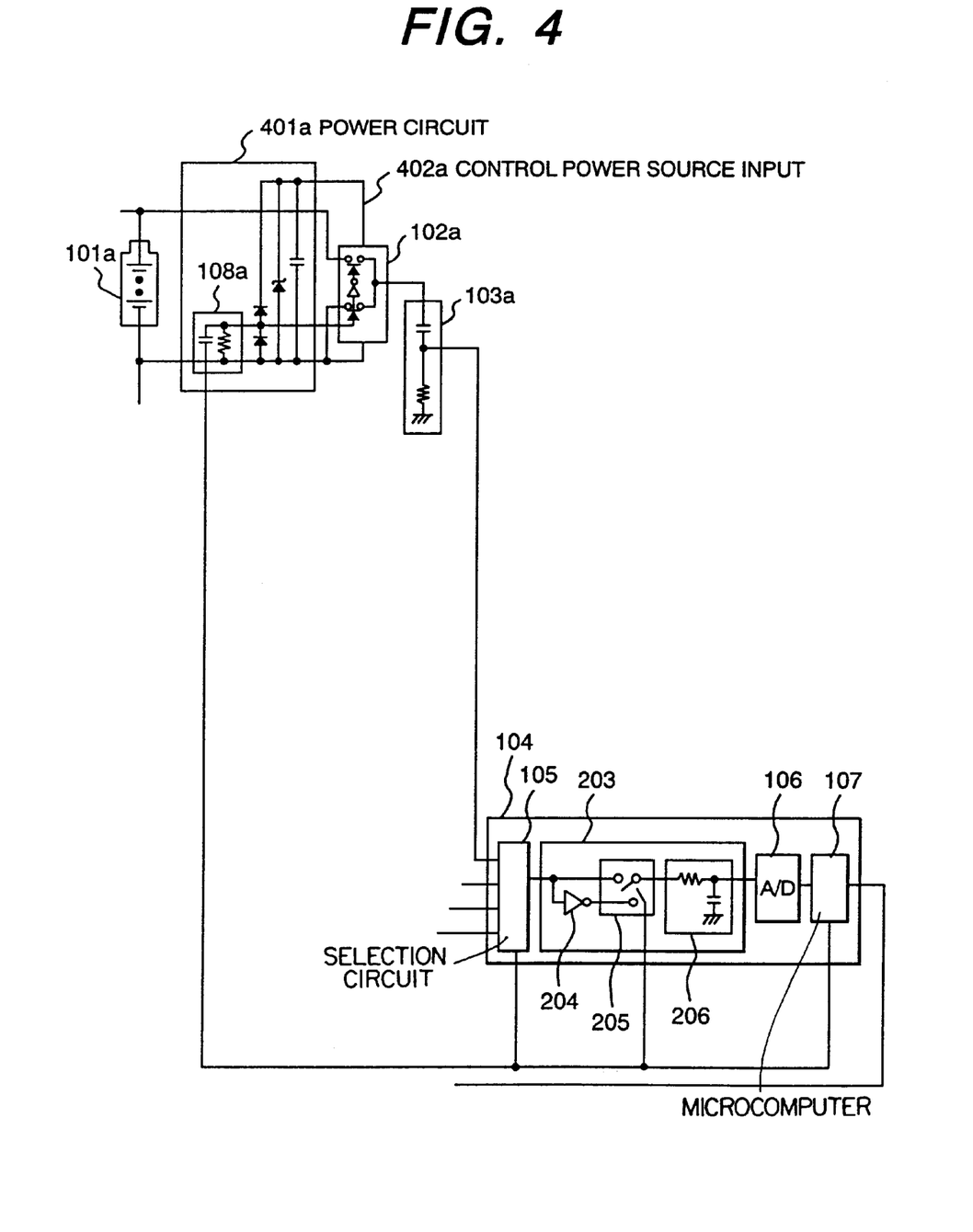
FIG. 4 is a circuit diagram showing the third embodiment of the present invention.

FIG. 4 is a circuit diagram showing the third embodiment of the electric power system of the present invention. In FIG. 4, reference numeral 401a indicates a power circuit and 402a indicates a control power source.

The power circuit 401a is composed of a boot strap circuit including the condenser coupler 108a and outputs an voltage higher than the inter-terminal voltage of the capacitor 101a.

In this case, the DC-AC conversion circuit 102a is composed of a multiplexer circuit and has the control power source 402a. The control power source 402a is connected to the power circuit 401a.

The input-output voltage of the multiplexer circuit is generally lower than the voltage of the control power source. When the control power source is changed, the input-output characteristics (voltage transfer characteristics such as rise time and breaking time) are changed.

Meanwhile, the AC-DC conversion circuit 203 selects the inverted value and non-inverted value of the condenser coupler 103a alternately and rectifies the full-wave, so that when the voltage transfer characteristics of the DC-AC conversion circuit 102 are changed, an error is caused at the time of conversion to a DC voltage.

Therefore, in this case, even when another power circuit 401a is installed, and a voltage is supplied to the control power source 402a, and the voltage of the capacitor 101a is changed, the voltage transfer characteristics of the DC-AC conversion circuit 102 are kept unchanged. Therefore, the AC-DC conversion operation of the AC-DC conversion circuit 203 is stabilized. According to this, the DC-AC conversion circuit 102a can convert the inter-terminal voltage information of the capacitor 101a stably and precisely.

In FIG. 4, the power circuit 401a is composed of a boot strap circuit. However, it may be composed of a switching power source using an insulating transformer.

In FIG. 4, only the capacitor 101a is shown as a representative. However, as shown in FIGS. 1 and 2, the capacitors are composed of four capacitors of 101a, 101b, 101c, and 101d connected in series, and the other capacitors 101b, 101c, and 101d also have the same power circuit and control power source as those shown in FIG. 4.

(Embodiment 4)

Figure 5:
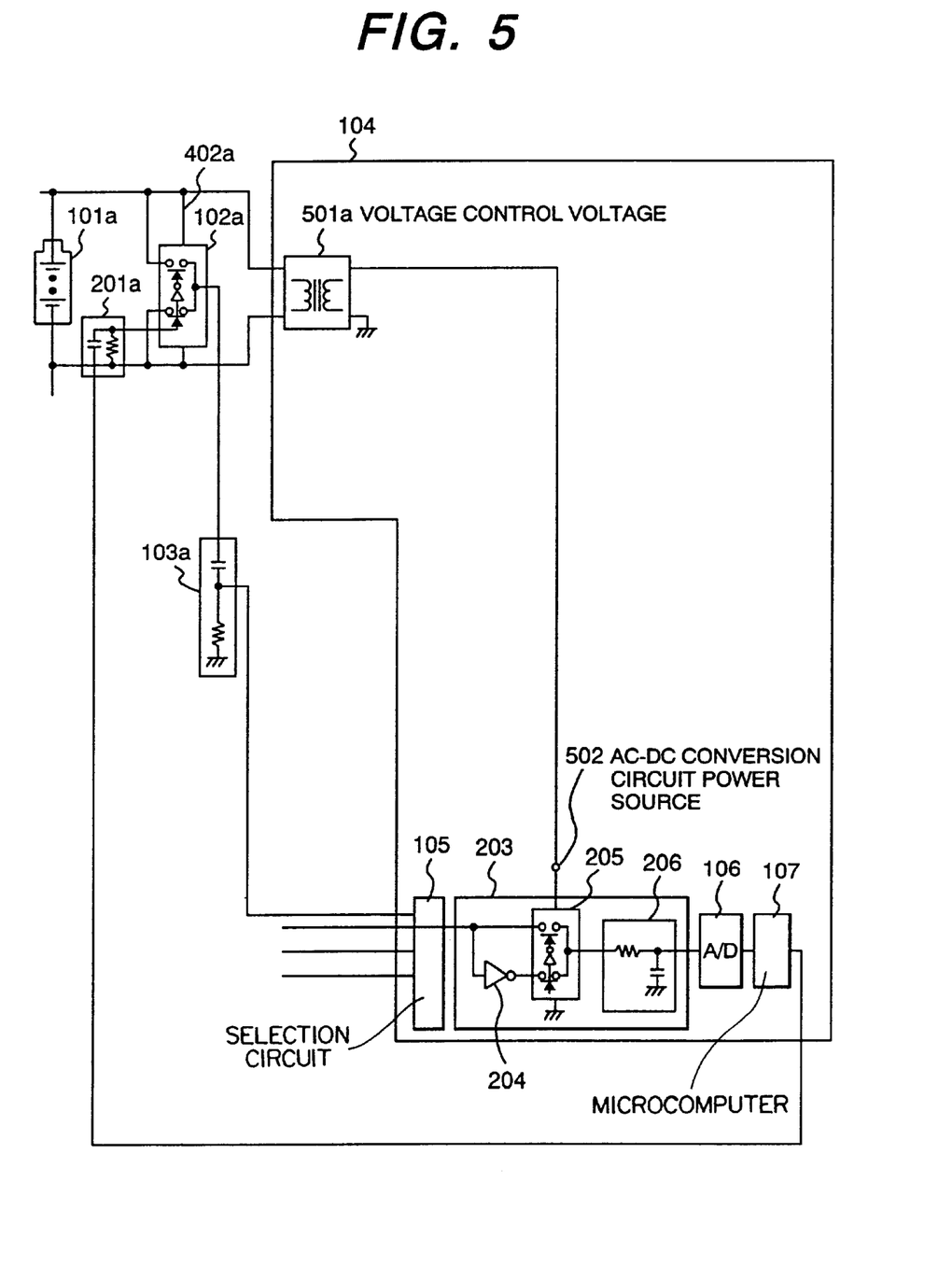
FIG. 5 is a circuit diagram showing the fourth embodiment of the present invention.

FIG. 5 is a circuit diagram showing the fourth embodiment of the power unit of the present invention. In FIG. 5, reference numeral 501a indicates a voltage control voltage source and 502a indicates an AC-DC conversion circuit power source.

The control circuit 104 includes the voltage control voltage source 501a. In FIG. 5, the voltage control voltage source 501a is shown as a switching power source using an insulating transformer. However, it may be realized by an insulating amplifier. The primary side at one end is connected to the capacitor 101a. However, it may be connected between both terminals of the train of capacitors 101 connected in series.

The voltage control voltage source 501a outputs a voltage corresponding to the inter-terminal voltage of the capacitor 101a. The output thereof is supplied to the AC-DC conversion circuit power source 502a of the AC-DC conversion circuit 203.

The switch 205 of the AC-DC conversion circuit 203 is composed of the same multiplexer as that of the DC-AC conversion circuit 102a and the control power source thereof is supplied from the voltage control voltage source 501a.

Here, the control power source 402 of the DC-AC conversion circuit 102a is connected to the capacitor 101a. Therefore, when the inter-terminal voltage of the capacitor 101a is changed, the voltage transfer characteristics of the DC-AC conversion circuit 102a are changed and the AC-DC conversion operation of the AC-DC conversion circuit 203 is unstabilized.

A voltage cooperated to the power source of the DC-AC conversion circuit 102a is also supplied to the AC-DC conversion circuit 203 so as to make the voltage transfer characteristics of the two coincide with each other, thereby stabilization of the AC-DC conversion operation is realized.

In the case, the power source in proportional to that of the DC-AC conversion circuit 102a is supplied to the AC-DC conversion circuit 203, for example. Additionally, it is possible to install the same number of the voltage control voltage source as the number of the capacitor 101a and arrange a sector between the AC-DC conversion circuit power source 502a and a voltage control voltage source 501a and arrange a sector between the output of microcomputer 107 and each condenser coupler 201a.

(Embodiment 5)

Figure 6:
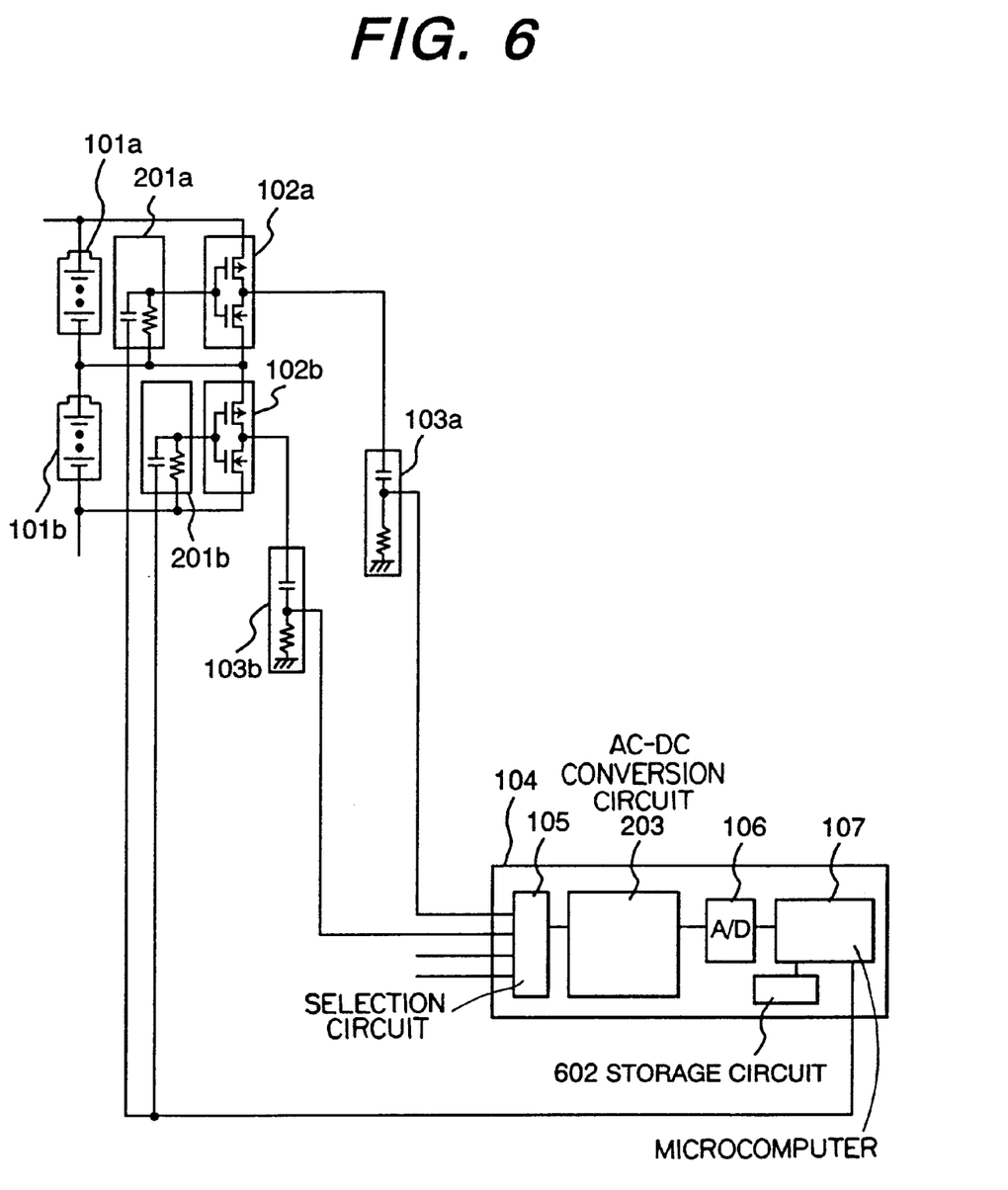
FIG. 6 is a circuit diagram showing the fifth embodiment of the present invention.

FIG. 6 is a circuit diagram showing the fifth embodiment of the present invention. In FIG. 6, reference numeral 602 indicates a storage circuit. The voltage detection circuit 107 and the storage circuit 602 are connected to the microcomputer 107.

The storage circuit 602 stores a voltage transfer error and an error correction formula of the path from the DC-AC conversion circuit 102a to the A-D conversion circuit 106 beforehand. The microcomputer 107 carries out correction operations on the value of a digital signal of the A-D conversion circuit 106 on the basis of the storage contents of the storage circuit 602.

According to this, the inter-terminal voltage of the capacitor 101a can be accurately detected and the reliability of the electric power system can be improved.

The storage circuit 602 may be any of a mask ROM, EPROM, flash memory and battery-back-up SRAM. It may be a separate semiconductor chip other than the microcomputer 107 or may be formed on a same semiconductor chip.

(Embodiment 6)

Figure 7:
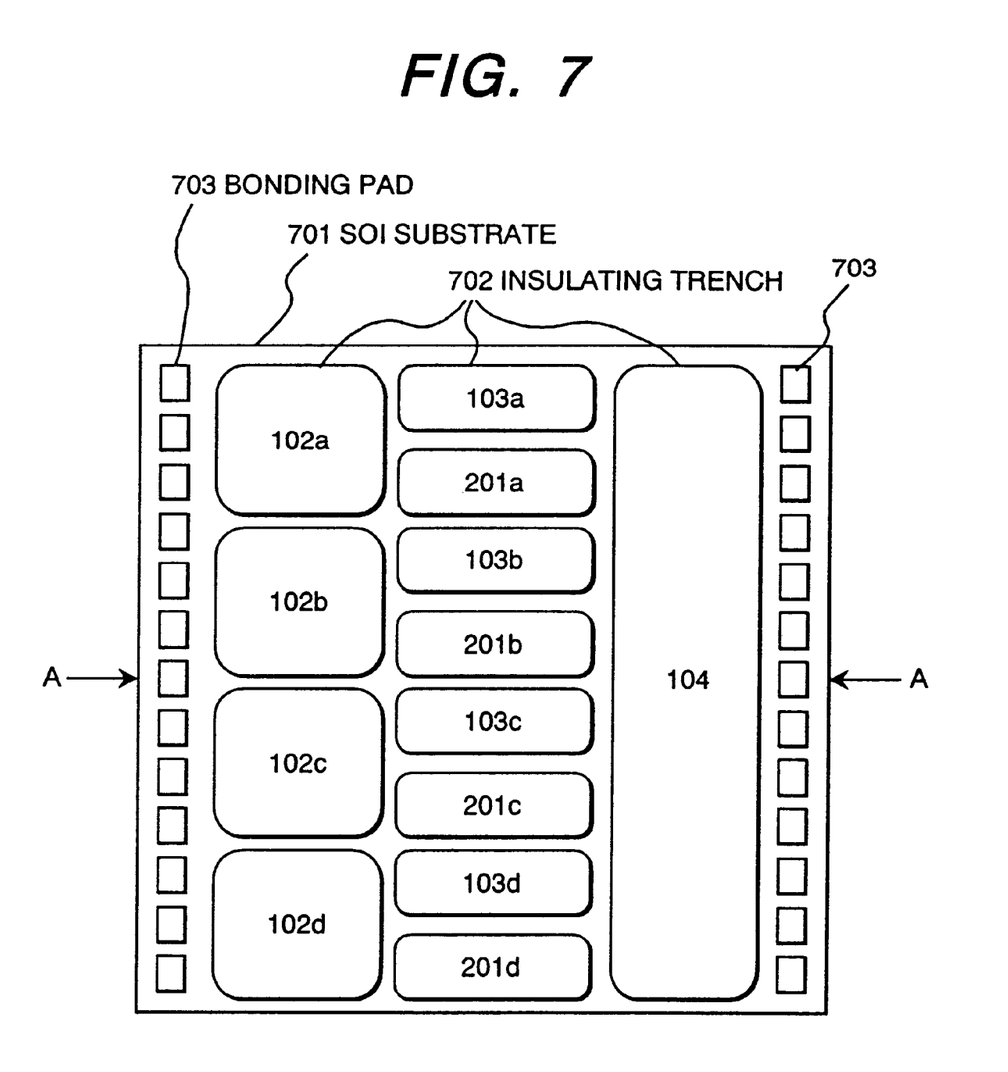
FIG. 7 is a view showing a substrate an IC of the sixth embodiment of the present invention.

FIG. 7 is a view showing a substrate of a sixth embodiment that the respective circuits of the first to fifth embodiments of the electric power system of the present invention are integrated. In FIG. 7, reference numeral 701 indicates an SOI (silicon on insulator) substrate, 702 an insulating trench, and 703 a bonding pad.

The insulating trench 702 is formed by filling a groove formed inside the SOI substrate 701 with an insulator such as $SiO_2$. The DC-AC conversion circuits 102a, the condenser couplers 103a and 201a, and the control circuit 104 integrated on the same SOI substrate 701 are enclosed by the insulating trench 702.

According to this embodiment, each circuit can be electrically insulated by the condenser coupler 103. Therefore, Each circuit can be low withstand voltage and the embodiment is suitable for the constitution to insulate the circuits from each other by the insulating trench 702.

Figure 8:
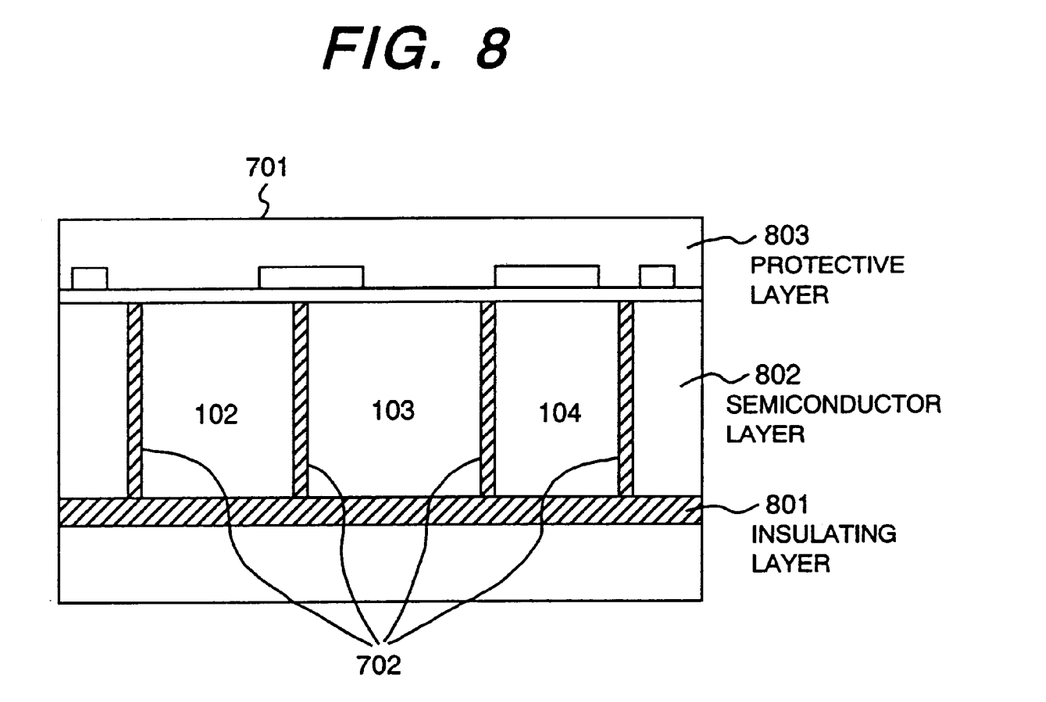
FIG. 8 is a sectional view of FIG. 7.

FIG. 8 is a sectional view indicated by an arrow A in FIG. 7. In FIG. 8, reference numeral 801 indicates an insulating layer, 802 a semiconductor layer, and 803 a protective layer. The semiconductor layer 802 is divided by a plurality of insulating trenches 702 and the area of the DC-AC conversion circuit 102, the area of the condenser couplers 103 and 201, and the area of the control circuit 104 are arranged from the left.

In this structure, the SOI substrate 701 having the insulating layer 801 of $SiO_2$ with a width of about 2 microns as an inner layer is prepared and each area is prepared on it using the thin film process using a photomask.

The SOI substrate has a constitution that a multiple insulating layer 801 of one layer of $SiO_2$ or additionally a polysilicon layer having an oxidized surface overlaid is overlaid on a single-crystal silicon substrate and furthermore a single-crystal silicon semiconductor layer is overlaid. Lamination uses a method for mirror-polishing and overlaying the surface of a silicon oxide film on the polysilicon surface and then bonding them by heat-treating at a specific temperature.

The insulating trench 702 is formed by a method for cutting a trench once and filling it with $SiO_2$ or BPSG(Boro-Phospho Silicate Glass), a method for oxidizing the trench wall thinly and filling the trench with polysilicon, a method for coating polyimide resin or SOG(Spin-On Glass), or a method for irradiating oxygen ions from the top and changing the semiconductor layer to an insulating material.

The protective layer 803 is an insulator of $SiO_2$, HLD (High Temperature Low pressure ecomposition Films), or SiN and includes a wiring layer of polysilicon or aluminum.

When folding the trench with 1.5 microms width and 15 microms depth and arranging in a square of about 160 microms, this embodiment can obtain an insulating property of about 2 pF per a square of about 160 microns and a withstand voltage of about 750 V per one insulating trench 702 in the DC withstand voltage test. When forming a pattern of the insulating trench 702, to prevent an acute-angled pattern, a circular arc pattern (a radius of 2 to 5 microns) as far as possible is used at a folding part or corner. By doing this, the withstand voltage by electric field concentration can be prevented from reduction.

In the embodiment, a plurality of circuits are physically insulated from the SOI substrate 701 by the insulating trench 702 and the insulating layer 801, so that it is possible to directly bond the semiconductor chip to the frame at the time of package mounting and dissipates heat satisfactorily. Further, although an IC having a multi-layer structure is warped not a little, the thickness of each layer can be adjusted by using an insulating multi-layer, thereby an effect of dispersion of stress and reducing in warp can be produced.

Here, assuming that the capacitors 101 are a module battery that 10 nickel-hydrogen batteries are connected in series and the nominal electromotive voltage is 12 V, the withstand voltage of DC-AC conversion circuit 102 is set to about 18 V with a margin. The withstand voltage of the control circuit 104 is about 5 V. The voltage when 25 module batteries mentioned above are connected in series is 300 V, which is sufficiently lower than the insulating property of the insulating trench 702. Therefore, the condenser couplers 103 and 201 and the other circuits can be integrated on the SOI substrate 701.

Since the aforementioned units can be integrated on the SOI substrate 701, a reliable power unit which is characterized in few parts, low cost, small size, low power consumption, high control precision, and high noise margin can be realized.

(Embodiment 7)

Figure 9:
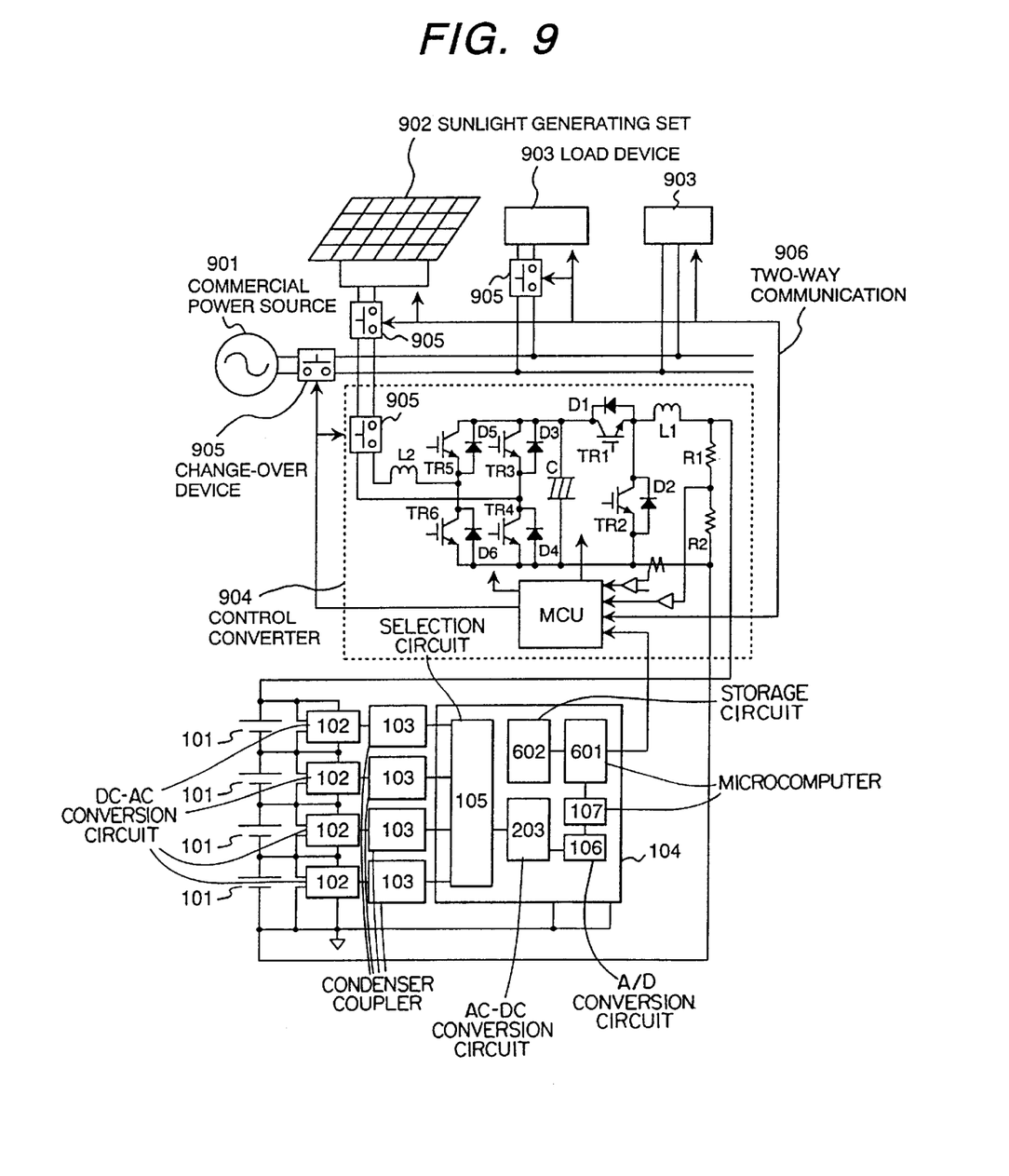
FIG. 9 is a circuit diagram showing an seventh embodiment of a sunlight power converter to which the present invention is applied.

FIG. 9 is a circuit diagram showing an seventh embodiment of the present invention. In FIG. 9, reference numeral 901 indicates a commercial power source, 902 a sunlight generating set, 903 a load device, 904 a control converter, and 905 a change-over device.

In FIG. 9, the electric power system is the same structure as the embodiment 1 to 6, and the plurality of capacitors 110 are connected in series, and the DC-AC conversion circuits 102 are respectively connected to both ends of each of the capacitors 101, and the output thereof is connected to the selection circuit 105 of the control circuit 104, the AC-DC conversion circuit 203, the voltage detection circuit 106, the microcomputer 107, and the storage circuit 602 via the condenser couplers 103.

The control converter 904 is connected to both ends of the train of the capacitors 101 and the microcomputer 601 in the control circuit 104 and the MCU in the control converter 904 are connected.

Furthermore, the sunlight generating set 902, the load device 903, and the control converter 904 are respectively connected to the common commercial power source 901 via the change-over device 905. At the same time, the sunlight generating set 902, the load device 903, the control converter 904, the change-over device 905, and the control circuit 104 are connected via two-way communication.

The sunlight generating set 902 is a device for converting the sunlight to DC power by a solar battery and outputting AC power by an inverter device.

The load device 903 is a household electric appliance such as an air conditioner, refrigerator, microwave oven, or lighting fixture, an electrical appliance such as a motor, elevator, computer, or medical appliance, or a second power unit. The control converter 904 is a charger-discharger for converting AC power to DC power or converting DC power to AC power. It serves as a controller for controlling charge and discharge and controlling the sunlight generating set 902 and the load device 903 mentioned above.

Each of these devices may have the change-over device 905 in the own device. The power unit of the present invention can be connected to the control converter 904 having a different constitution from that shown in the drawing and the other devices.

According to this embodiment, when the power required by the load device 903 cannot be supplied by the commercial power source 901 or the sunlight generating set 902, power is supplied from the capacitor 101 via the control converter 904. When power supply form the commercial power source 901 or the sunlight generating set 902 is excessive, unnecessary power is stored in the capacitor 101 via the control converter 904.

During the aforementioned operation, when the inter-terminal voltage of the capacitor 101 reaches the discharge stop level or charge stop level, the control circuit 104 transmits a signal indicating it to the control converter 904 and the control converter 904 controls charging or discharging.

In the aforementioned embodiments, the contract demand and power consumption of the commercial power source 901 and the power generation rating of the sunlight generating set 902 can be lowered and the equipment cost and running cost can be reduced.

When power consumption is concentrated in a certain time zone, the capacitor 101 supplies power to the commercial power source 901 and when power consumption is little, the power unit stores power, thus concentration of the power consumption is moderated and the power consumption can be averaged.

Furthermore, the control converter 904 monitors the power consumption of the load device 903 and controls the load device 903, so that energy conservation and effective utilization of power can be realized.

Figure 10:
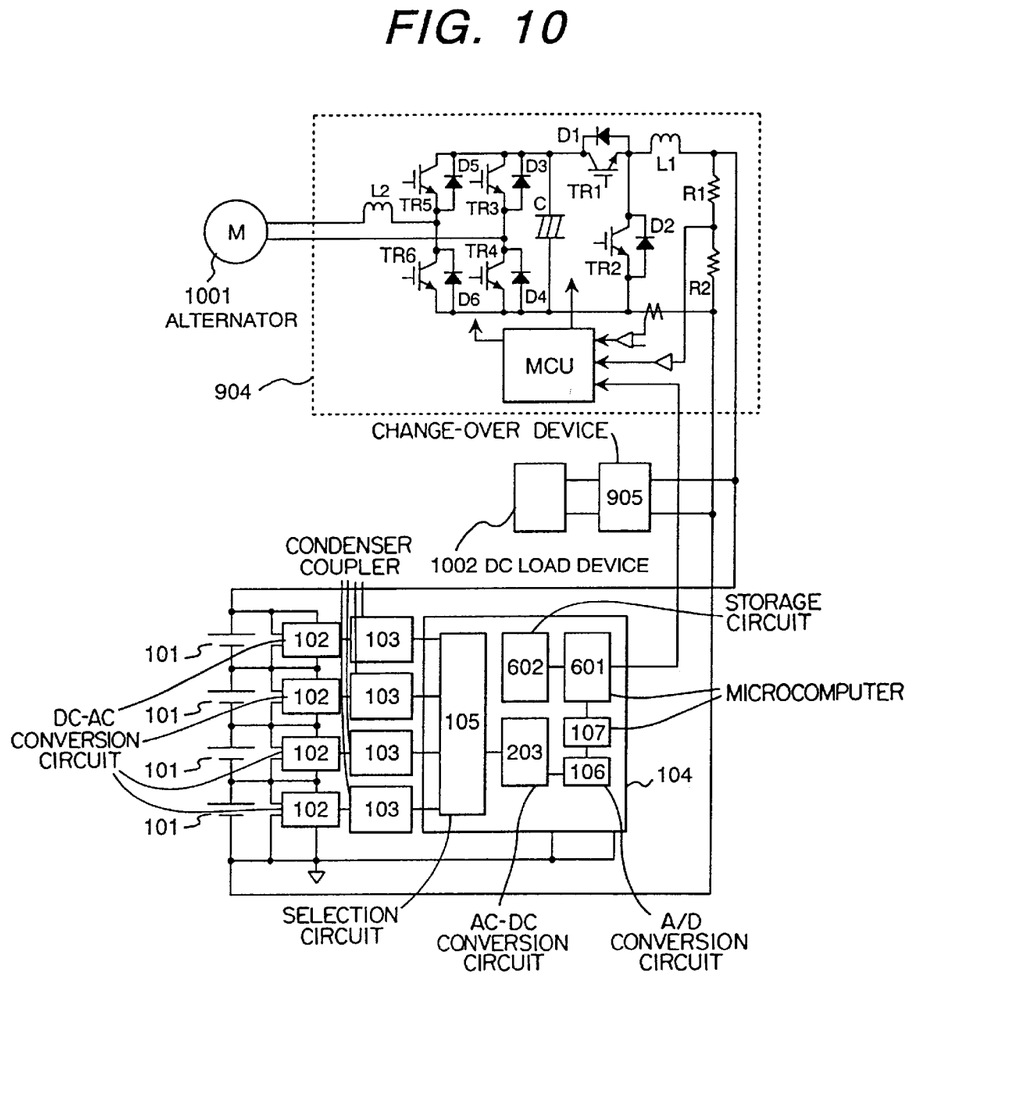
FIG. 10 is a circuit diagram showing an embodiment of a part of an automobile to which the present invention is applied.

FIG. 10 is a circuit diagram showing an embodiment of a part of an automobile to which an embodiment of the power unit of the present invention is applied. In FIG. 10, reference numeral 1001 indicates an alternator and 1002 indicates a DC load device. FIG. 10 is an extract of a part of the constitution.

The alternator 1001 is connected to the train of the capacitors 101a, - - - via the control converter 904.

The alternator 1001 executes engine start, assistance of the drive force (motoring), and power generation (generation). During motoring, the train of the capacitors 101 supplies power to the alternator 1001 via the control converter 904. During generation, the alternator 1001 inversely supplies power to the train of the capacitors 101 via the control converter 904.

The DC load device 1002 is an electric load such as a solenoid valve or audio unit or a second power unit such as a lead battery. The DC load device 1002 is connected to the train of the capacitors 101 via the change-over device 905.

By doing this, an automobile for assisting the engine torque at the time of departure and converting and storing the kinetic energy to power at the time of application of the break can be realized.

What is claimed is:

1. An electric power system comprising:
   a plurality of capacitors connected in series;
   a plurality of DC-AC conversion circuits for converting and outputting each DC voltage of said plurality of capacitors to an AC signal that an AC component equivalent to an inter-terminal DC voltage of said each capacitor is superimposed on said each DC voltage;
   a plurality of condenser couplers for breaking said each DC voltage from each output of said plurality of DC-AC conversion circuits and outputting said AC components respectively; and
   a processing circuit for detecting an inter-terminal DC voltage of a corresponding capacitor for the AC component of each output of said plurality of condenser couplers.

2. An electric power system according to claim 1, wherein said plurality of DC-AC conversion circuits have a plurality of control power sources for outputting a voltage higher than said inter-terminal voltage of said plurality of capacitors and perform a conversion operation of said plurality of DC-AC conversion circuits by said output of said plurality of control power sources.

3. An electric power system according to claim 1, wherein aid processing circuit ahs at least one voltage control voltage source for outputting a voltage proportional to said inter-terminal voltage of each capacitor of said plurality of capacitors and said output of said at least one voltage control voltage source is used as a power source of said DC-AC conversion circuit.

4. An electric power system according to claim 1, wherein said processing circuit has a storage circuit for storing a correction formula and an output of an A-D conversion circuit is correction-operated by a microcomputer on the basis of said storage contents of said storage circuit.

5. An electric power system comprising:
   a plurality of capacitors connected in series;
   a plurality of DC-AC conversion circuits for converting and outputting each DC voltage of said plurality of capacitors to an AC signal that an AC component equivalent to an inter-terminal DC voltage of said each capacitor is superimposed on said each DC voltage;
   a plurality of condenser couplers for breaking said each DC voltage from each output of said plurality of DC-AC conversion circuits and outputting said AC components respectively; and
   a processing circuit for converting the AC component of each output of said plurality of condenser couplers to a digital signal, and detecting an inter-terminal DC voltage of a corresponding capacitor from said digital signal.

6. An electric power system according to claim 5, wherein said processing circuit has an A-D conversion circuit for converting the AC component of the output from said plurality of condenser couplers to said digital signal, and a microcomputer for detecting said inter-terminal DC voltage of said corresponding capacitor from said digital signal.

7. An electric power system according to claim 6, wherein said processing circuit has an AC-DC conversion circuit for converting the AC component to a DC voltage which is full-wave rectified and supplies said converted DC voltage to said A-D conversion circuit.

8. An electric power system according to claim 7, wherein said plurality of DC-AC conversion circuits have a plurality of control power sources for outputting a voltage higher than said inter-terminal voltage of said plurality of capacitors and perform a conversion operation of said plurality of DC-AC conversion circuits by said output of said plurality of control power sources.

9. An electric power system according to claim 7, wherein said processing circuit has at least one voltage control voltage source for outputting a voltage proportional to said inter-terminal voltage of each capacitor of said plurality of capacitors and said output of said at least one voltage control voltage source is used as a power source of said DC-AC conversion circuit.

10. An electric power system according to claim 7, wherein said processing circuit has a storage circuit for storing a correction formula and said output of said A-D conversion circuit is correction-operated by a microcomputer on the basis of said storage contents of said storage circuit.

11. An electric power system according to claim 5, wherein said processing circuit has a selection circuit for selecting the output of said plurality of condenser couplers, an A-D conversion circuit for converting the AC component of the output from said plurality of condenser couplers to said digital signal, and a microcomputer for detecting said inter-terminal DC voltage of said corresponding capacitor from said digital signal.

12. An electric power system according to claim 5, wherein said plurality of DC-AC conversion circuits have a plurality of control power sources for outputting a voltage higher than said inter-terminal voltage of said plurality of capacitors and perform a conversion operation of said plurality of DC-AC conversion circuits by said output of said plurality of control power sources.

13. An electric power system according to claim 5, wherein said processing circuit has at least one voltage control voltage source for outputting a voltage proportional to said inter-terminal voltage of each capacitor of said plurality of capacitors and said output of said at least one voltage control voltage source is used as a power source of said DC-AC conversion circuit.

14. An electric power system according to claim 5, wherein said processing circuit has a storage circuit for storing a correction formula and an output of an A-D conversion circuit is correction-operated by a microcomputer on the basis of said storage contents of said storage circuit.

15. An electric power system according to claim 1 or 5, wherein at least one circuit of said DC-AC conversion circuit, said condenser coupler, and said processing circuit is each enclosed by an insulating trench formed on a substrate.

* * * * *